United States Patent
Kikuchi

Patent Number: 6,041,414
Date of Patent: Mar. 21, 2000

[54] UNINTERRUPTIBLE POWER SUPPLY APPARATUS WHICH SUPPLIES GUARANTEED POWER TO ELECTRONIC APPARATUSES IN A SYSTEM

[75] Inventor: Kazuhito Kikuchi, Kawasaki, Japan

[73] Assignee: Fujitsu Limited, Kawasaki, Japan

[21] Appl. No.: 08/870,735

[22] Filed: Jun. 6, 1997

[30] Foreign Application Priority Data

Dec. 3, 1996 [JP] Japan .................................. 8-322993

[51] Int. Cl.$^7$ ........................................ G06F 1/00
[52] U.S. Cl. .................. 713/300; 713/310; 713/320; 713/322; 713/324; 713/330; 713/340; 710/7; 365/228; 365/226; 365/229; 307/38; 307/41; 307/64; 307/66; 307/85
[58] Field of Search ................. 307/64, 66, 41, 307/38, 85; 395/750.07, 750.04, 750.08, 750.01, 827; 365/228, 226, 229; 713/300, 310, 320, 322, 330, 324, 340; 710/7

[56] References Cited

U.S. PATENT DOCUMENTS

| | | | |
|---|---|---|---|
| 3,710,214 | 1/1973 | Anderson | 318/102 |
| 5,019,717 | 5/1991 | McCurry et al. | 307/66 |
| 5,117,324 | 5/1992 | Johson, Jr. | 361/66 |
| 5,315,533 | 5/1994 | Stich et al. | 364/480 |
| 5,534,734 | 7/1996 | Pugh et al. | 307/38 |
| 5,761,084 | 6/1998 | Edwards | 364/492 |
| 5,765,001 | 6/1998 | Clark et al. | 395/750.08 |
| 5,781,448 | 7/1998 | Nakamura et al. | 364/492 |

FOREIGN PATENT DOCUMENTS

| | | | |
|---|---|---|---|
| 63-180117 | 7/1988 | Japan . | |
| 4-023114 | 1/1992 | Japan . | |
| 404112626 | 4/1992 | Japan | H02J 3/38 |
| 5-224784 | 9/1993 | Japan . | |
| 405257573 | 10/1993 | Japan | G06F 1/30 |
| 7-028567 | 1/1995 | Japan . | |
| 7-295688 | 11/1995 | Japan . | |

*Primary Examiner*—Ayaz R. Sheikh
*Assistant Examiner*—Frantz Blanchard Jean
*Attorney, Agent, or Firm*—Staas & Halsey, LLP

[57] ABSTRACT

A plurality of output terminals from which the power from an uninterruptible power supply apparatus is supplied. A timing holding unit holds timing information of power supply start and/or stop of respective ones of the plurality of output terminals, the timing information being set independently for each one of the plurality of output terminals. A timing pulse generating unit generates timing pulses which are used for reading out the timing information from the timing holding unit. Power supply start and/or stop of each output terminal is performed based on the timing information read out from the timing holding unit.

8 Claims, 8 Drawing Sheets

UNINTERRUPTIBLE POWER SUPPLY APPARATUS WHICH SUPPLIES GUARANTEED POWER TO ELECTRONIC APPARATUSES IN A SYSTEM

BACKGROUND OF THE INVENTION

1. Field of the Invention

The present invention relates to an uninterruptible power supply apparatus, in particular, to an uninterruptible power supply apparatus which supplies guaranteed power to a plurality of electronic apparatuses which constitute a system.

Recently, costs of personal computers have been reduced and such personal computers have come into remarkably wide use. This situation is a result of users who have used large-size computers now using personal computers in accordance with the current trend of downsizing. In particular, a large number of external storage devices such as hard disk devices are connected to a personal computer server or the like. Also, a network is connected to such a personal computer server. In such a personal computer system, when the personal computer server fails to perform its normal operations, the entire system, for which the personal computer server functions, fails to perform its normal operations. Thus, a very large influence is given to the system. In order to prevent such a situation, guaranteed or backup power supply in case of commercial-power-supply failure or momentary power interruption of the entire system including the personal computer server and peripheral equipment thereof is necessary.

A personal computer server has, for example, an external hard disk device, an external hard disk array, a printer, an external magneto-optical disk device, an external digital audio tape recorder and so forth connected thereto. In such a case, a sequence of power supply start and power supply stop is strictly predetermined among the peripheral equipment. In a case of a commercial-power-supply failure, it is required that an uninterruptible power supply apparatus instead starts supplying power, and a system shutdown process starts. In the system shutdown process, it is required that power supply to the personal computer and the peripheral equipment is stopped in the predetermined sequence. Such an uninterruptible power supply apparatus (hereinafter, referred to as UPS) includes a battery, and, in a case of commercial power supply failure, the battery supplies power to the system including the personal computer and peripheral equipment thereof. Thus, the UPS guarantees a power supply. Further, it is necessary that the UPS has a plurality of output terminals for the personal computer and peripheral equipment, and, through the output terminals, supply power is started (ON) and stopped (OFF) for the respective components of the personal computer and peripheral equipment, individually.

2. Description of the Related Art

For example, Japanese Laid-Open Patent Application Nos. 7-28567, 7-295688, 5-224784, 4-23114 and 63-180117 disclose UPSs in the prior art.

Although a UPS in the prior art may have a plurality of output terminals for supplying power, the output terminals are obtained merely as a result of parallel connection. Accordingly, it is not possible to set power supply start/stop timing individually among the respective output terminals. Further, when a plurality of UPSs in the prior art are used in a personal computer system, power supply by the UPSs can be started/stopped neither all at once nor in a predetermined sequence. Further, it is not possible to control a plurality of UPSs by a single personal computer.

In a UPS in the prior art, it is not possible to set a power supply start/stop sequence/timing individually among the respective ones of a plurality of output terminals. Accordingly, it is not possible to set sequence/timing of a power supply start/stop among the respective components of a system including a personal computer and peripheral equipment such as an external hard disk device, an external hard disk array, printer and so forth. As a result, when a commercial power supply failure occurs and the system including the personal computer and peripheral equipment is stopped, or a commercial power supply starts and the system is started, power supply to the entirety of the system (including the personal computer and peripheral equipment) is stopped all at once or is started all at once.

Further, in a personal computer system to which a power supply is guaranteed, there is a case where peripheral equipment such as an external hard disk device, and an external hard disk array, an external magneto-optical disk device and an external digital audio tape recorder is additionally provided. In such a case, a new UPS is provided for the additionally provided equipment. As a result, there is a plurality of UPSs in the single personal computer system. However, in the prior art, when a plurality of UPSs are used to the system, power supply by the UPSs is started/stopped neither all at once nor in a predetermined sequence. Accordingly, it is not possible to set the power supply stop/start sequence/timing for the personal computer and peripheral equipment in the personal computer system. Further, the UPS, which is originally connected to the personal computer for power supply in the personal computer system before the additional provision of the peripheral equipment, transmits various kinds of information to the personal computer and receives various kinds of information from the personal computer. The information transmitted to the personal computer from the UPS includes the remaining battery power of the remaining battery life (the number of repetitive charging and discharging operations), the voltage of the commercial power supply, the current consumed by the loads, and so forth. The information transmitted from the personal computer to the UPS includes a power supply stop time for the night and a power supply start time for the following morning. However, in the prior art, it is not possible that a single personal computer controls a plurality of UPSs. The amount of information which can be transmitted and received between the personal computer and UPS is limited to the number of interface terminals of the personal computer provided for the UPS. As a result, the above-described information transmission and reception cannot be performed between the personal computer and the new UPS provided for the additionally provided peripheral equipment.

SUMMARY OF THE INVENTION

The present invention has been devised in consideration of the above-described problems. An object of the present invention is to provide a UPS (UPSs) which performs a power supply start and/or stop of a plurality of electronic apparatuses, which constitute a system, in a predetermined sequence/timing.

In a first aspect of the present invention, an uninterruptible power supply apparatus which supplies guaranteed power to electronic apparatuses, comprises:

a plurality of output terminals, from which the power is supplied;

timing holding means for holding timing information of power supply start and/or stop of the respective ones of the plurality of output terminals, the timing information being set independently for each one the plurality of output terminals; and timing pulse generating means for generating timing pulses which are used for reading out the timing information from the timing holding means, wherein power supply start and/or stop of each output terminals is performed based on the timing information read out from the timing holding means.

In this arrangement, in the timing set in the timing holding means, power supply start and/or stop of the respective ones of the plurality of output terminals is performed. Thus, it is possible that sequence and time differences of power supply start and/or stop of the plurality of output terminals can be arbitrarily set.

In a second aspect of the present invention, the uninterruptible power supply apparatus in the first aspect of the present invention further comprises a first interface, wherein the uninterruptible power supply apparatus is connected to a computer through the first interface and the timing information is supplied from the computer and is held by the timing holding means.

Thus, it is possible that, using the timing set through the computer, sequence and time differences of power supply start and/or stop of the plurality of output terminals can be arbitrarily set. Accordingly, by supplying power to the personal computer and its peripheral equipment separately from the plurality of output terminals, it is possible that power supply start and/or stop of the personal computer and peripheral equipment can be performed sequentially by predetermined timing.

In a third aspect of the present invention, the uninterruptible power supply apparatus in the second aspect of the present invention further comprises a second interface, wherein the uninterruptible power supply apparatus is connected with a preceding apparatus through the first interface, and also is connected with a following apparatus through the second interface, thus a plurality of uninterruptible power supply apparatuses are connected in a cascade connection.

By connecting the plurality of uninterruptible power supply apparatuses in a cascade connection, power supply start and/or stop of the respective output terminals of each apparatus can be performed in synchronization with each other.

In a fourth aspect of the present invention, in the uninterruptible power supply apparatus in the third aspect of the present invention, each of the first and second interfaces has a timing pulse line for supplying the timing pulses; and changeover means is provided for using, in reading out the timing information from the timing holding means, the timing pulses which are supplied from a preceding apparatus through the timing pulse line of the second interface of the preceding apparatus and the timing pulse line of the first interface of the uninterruptible power supply apparatus instead of using the timing pulses generated by the timing pulse generating means of the uninterruptible power supply apparatus.

This timing of power supply start and/or stop of the respective output terminals of each of the plurality of uninterruptible power supply apparatuses connected in a cascade connection is determined based on the common timing pulses. Further, there is approximately no time delay when the timing pulses are transmitted between the plurality of uninterruptible power supply apparatuses. Accordingly, it is possible to precisely determine the timing of power supply start and/or stop of the respective output terminals of each uninterruptible power supply apparatus.

In a fifth aspect of the present invention, in the uninterruptible power supply apparatus in the third aspect of the present invention, the first one of the plurality of uninterruptible power supply apparatuses connected in a cascade connection is connected to a computer and the first one of the plurality of uninterruptible power supply apparatuses performs transmission and reception of information of all of the plurality of uninterruptible power supply apparatuses with the computer.

In this arrangement, when an uninterruptible power supply apparatus is added due to the addition of peripheral equipment or the like, the additional uninterruptible power supply apparatus is connected to the last-stage uninterruptible power supply apparatus of the original uninterruptible power supply apparatus group in a cascade connection. Accordingly, it is not necessary to add an interface to the computer. The computer can set timing of the power supply start and/or stop of the respective output terminals of each of the plurality of uninterruptible power supply apparatuses.

In a sixth aspect of the present invention, in the uninterruptible power supply apparatus in the fifth aspect of the present invention, information of operational states of the respective ones of the plurality of uninterruptible power supply apparatuses connected in a cascade connection is supplied to the computer from the first one of the plurality of uninterruptible power supply apparatuses.

Thereby, the computer can know the information of operational states of the respective ones of the plurality of uninterruptible power supply apparatuses connected in a cascade connection as a result of communication with the first one of the plurality of uninterruptible power supply apparatuses.

In a seventh aspect of the present invention, in the uninterruptible power supply apparatus in the first aspect of the present invention, the timing holding means comprises:

a non-volatile memory for storing the timing information; and a counter for counting the timing pulses and generating addresses for reading out the timing information from the non-volatile memory.

Thereby, the timing information stored in the timing holding means is read out in synchronization with the timing pulses, and thereby, power supply start and/or stop of the respective output terminals are performed.

Other objects and further features of the present invention will become more apparent from the following detailed description when read in conjunction with the accompanying drawings.

DETAILED DESCRIPTION OF THE PREFERRED EMBODIMENT

Figure 1:
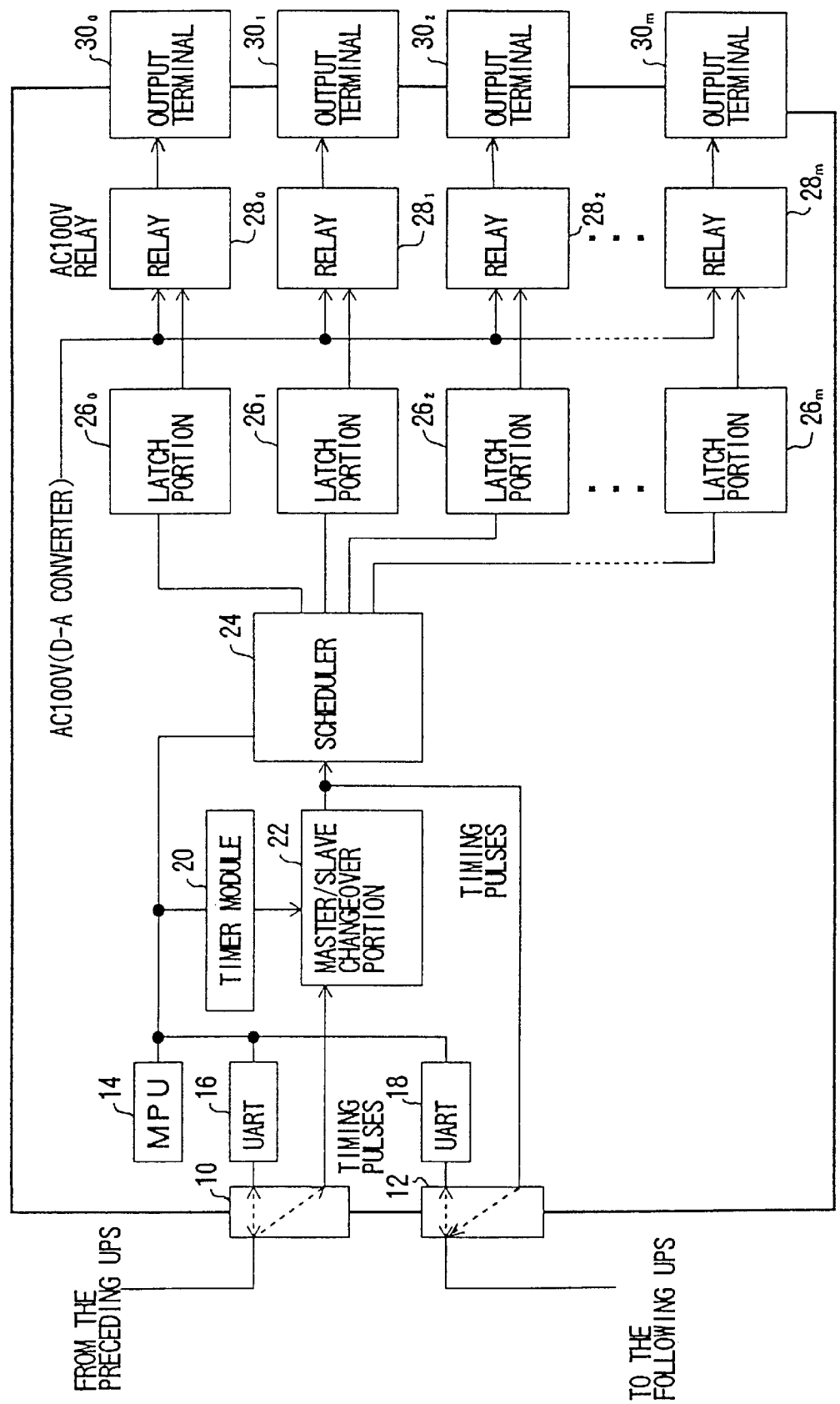
FIG. 1 shows a block diagram of a UPS in one embodiment of the present invention.

FIG. 1 shows a block diagram of a UPS in one embodiment of the present invention. In the figure, an interface 10 receives information from a personal computer or another UPS. An interface 12 transmits information to another UPS. Each of the interfaces 10 and 12 comprise a general RS-232C interface which has a timing pulse line, specially provided for ON/OFF control, added thereto.

A microprocessor (MPU) 14 performs control of each portion of the UPS. Interface controllers (UARTs) 16 and 18 control start-stop synchronism of the interfaces 10 and 12, respectively. Each of the interface controllers (UARTs) has an arrangement identical to the 8251 manufactured by Intel corporation. A timer module 20, acting as timing pulse generating means, generates timing pulses and timing of the power supply start/stop (ON/OFF) in each output terminal is based on the timing pulses.

A master/slave changeover portion 22, acting as changeover means, performs changeover depending on to whether the timer module 20 of the UPS or the timer module of the other UPS, which is connected to the master/slave changeover portion 22 via the interface 10, is connected to a scheduler 24. The scheduler, acting as timing holding means, stores therein the timing in which power supply is started/stopped in the respective ones of the plurality of output terminals of the UPS, according to instructions by the MPU 14. According to instructions by the timing pulses provided from the master/slave changeover portion 22, the scheduler 24 performs the power supply start/stop (ON/OFF) control in each output terminal.

Latch portions $26_0, 26_1, 26_2, \ldots, 26_m$ are provided for the power supply output terminals $30_0, 30_1, 30_2, \ldots, 30_m$ of the UPS, respectively. These latch portions hold ON/OFF control signals, respectively, which the scheduler 24 output for the output terminals, respectively. The latch portions supply the ON/OFF control signals to relays $28_0, 28_1, 28_2, \ldots, 28_m$, respectively, which are provided for the output terminals $30_0, 30_1, 30_2, 30_m$, respectively. AC 100 V power is supplied to the respective ones of the relays $28_0, 28_1, 28_2, \ldots, 28_m$. The AC 100 V power is obtained from converting DC power output by a built-in battery into AC power. According to the ON/OFF control signals supplied from the latch portions $26_0, 26_1, 26_2, 26_m$, the relays $28_0, 28_1, 28_2, \ldots, 28_m$ starts/stops (ON/OFF) AC 100 V power supply of the output terminals $30_0, 30_2, 30_3, \ldots, 30_m$, respectively. A personal computer and various peripheral equipment such as an external hard disk device, and so forth, are connected to the output terminals $30_0, 30_2, 30_3, \ldots, 30_m$, respectively, and thereby, the UPS supplies AC 100 V power to these components via these output terminals.

Figure 2:
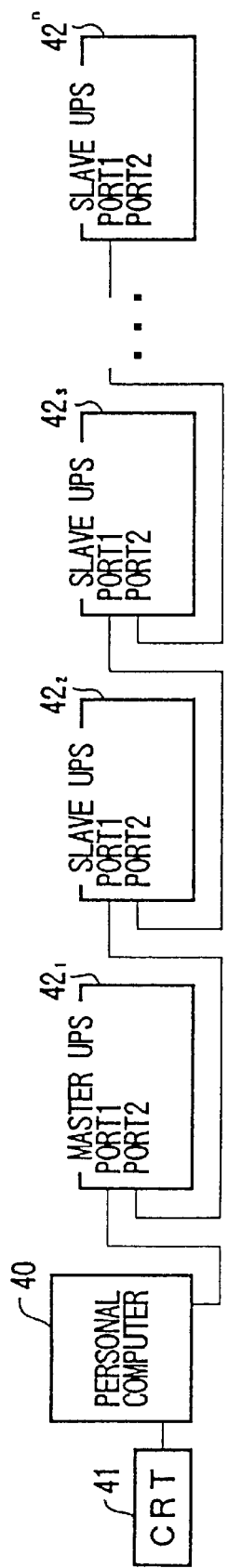
FIG. 2 shows an arrangement diagram of a system including a plurality of UPSs of the present invention.

FIG. 2 shows an arrangement diagram of a system including a plurality of UPSs of the present invention. A personal computer 40 controls the respective ones of the plurality of UPSs $42_1, 42_2, 42_3, \ldots, 42_n$. The internal arrangement of each of the UPS $42_1, 42_2, 42_3, \ldots, 42_n$ is identical to the arrangement shown in FIG. 1. The personal computer 40 is connected to the interface 10 (port 1) of the UPS $42_1$. The interface 12 (port 2) of the UPS $42_1$ is connected to the interface 10 (port 1) of the following UPS $42_2$. Similarly, the UPSs $42_1, 42_2, 42_3, \ldots, 42_n$ are connected in a cascade connection. The UPS $42_1$ connected with the personal computer 40 acts as a master UPS and the following UPSs $42_2, 42_3, \ldots, 42_n$ act as slave UPSs, respectively. Any of the UPSs $42_1, 42_2, 42_3, \ldots, 42_n$, for example, the UPS $42_1$ supplies power to the personal computer 40.

The master UPS $42_1$ receives instructions for the UPSs $42_1, 42_2, 42_3, \ldots, 42_n$ which are supplied by the personal computer 40. The master UPS $42_1$ breaks down the received instructions to respective instructions of the UPS $42_1, 42_2, 42_3, \ldots, 42_n$. The UPS $42_1$ communicates with and thus supplies the instructions after they are broken down to the UPSs $42_2, 42_3, \ldots, 42_n$, respectively. Thus, the master UPS $42_1$ gives instructions of power supply ON/OFF control of the respective output terminals of each of the slave UPSs $42_2, 42_3, \ldots, 42_n$. Further, the master UPS $42_1$ receives, from each slave UPS, information, such as the remaining battery power, the remaining battery life (the number of repetitive charging and discharging operations), the voltage of the commercial power supply, the currents consumed by the loads, and so forth. Then, the master UPS $42_1$ informs the personal computer 40 of the thus-received information together with the corresponding information.

The master UPS $42_1$ supplies the timing pulses, and thereby, power supply ON/OFF of the respective output terminals $30_0, 30_1, 30_2, \ldots, 30_m$ of each of the slave UPSs $42_2, 42_3, \ldots, 42_n$ is performed in synchronization with each other.

Each of the slave UPSs $42_2, 42_3, \ldots, 42_n$ sets the instructions of the power supply ON/OFF of the respective output terminals $30_0, 30_1, 30_2, \ldots, 30_m$, supplied from the master UPS $42_1$ for this UPS, to the scheduler 24. According to the thus-set instructions, each slave UPS performs the ON/OFF control of the power supply of the respective output terminals in synchronization with the timing pulses supplied from the master UPS $42_1$. Each slave UPS informs the master UPS $42_1$ of information such as the remaining battery power, the remaining battery life (the number of repetitive charging and discharging operations), the voltage of the commercial power supply, the currents consumed by the loads, and so forth, concerning this slave UPS. Each slave UPS receives, from the master UPS $42_1$, information such as a power supply stop time for the night and a power supply start time for the following morning. Each UPS informs the following UPS of information received from the preceding UPS, if necessary.

Figure 3:
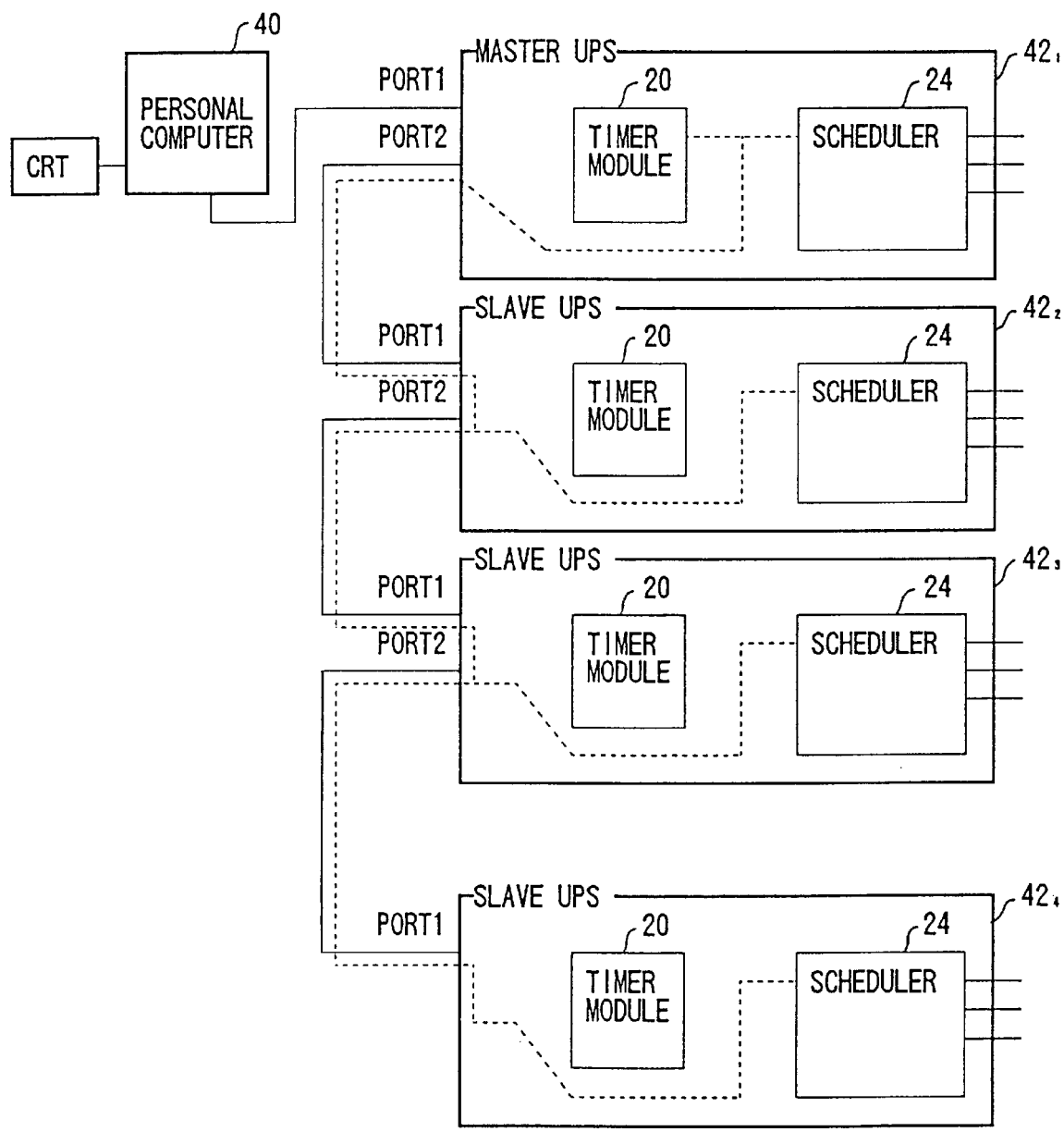
FIG. 3 shows a diagram for describing functions of each UPS when four UPSs of the present invention are connected in cascade connection.

FIG. 3 shows a diagram for describing functions of each UPS when the UPS $42_1, 42_2, 42_3$ and $42_4$ are connected in a cascade connection. In this case, timing pulses generated by the timer module 20 of the master UPS $42_1$ are, as indicated by broken lines, supplied to the scheduler 24 of the master UPS $42_1$. Also, the timing pulses are supplied to the respective ones of the slave UPSs $42_2, 42_3$ and $42_4$, and are supplied to the schedulers 24 of the respective slave UPSs $42_2, 42_3$ and $42_4$. The timer module 20 of each of the slave UPSs $42_2, 42_3$ and $42_4$ is disconnected from the scheduler 24 by the master/slave changeover portion 22 of this UPS.

Thereby, the power supply ON/OFF timing of the respective output terminals $30_0, 30_1, 30_3, \ldots, 30_m$ of each of the UPS $42_1, 42_2, 42_3$ and $42_4$ is in synchronization with the timing pulses. Thus, the accuracy of the power supply ON/OFF timing is improved. Further, the timing pulses output from the master UPS $42_1$ is not transmitted to the slave UPS $42_2, 42_3, 42_4$ via the RS-232C interface, and thus via software, but is transmitted through the timing pulse lines specially provided in the interfaces 10 and 12. Accordingly, delay of the timing pulses is merely delay due to a signal receiving circuit device provided on the timing pulse lines. Thus, the delay of the timing pulse is not problematic.

Figure 4:
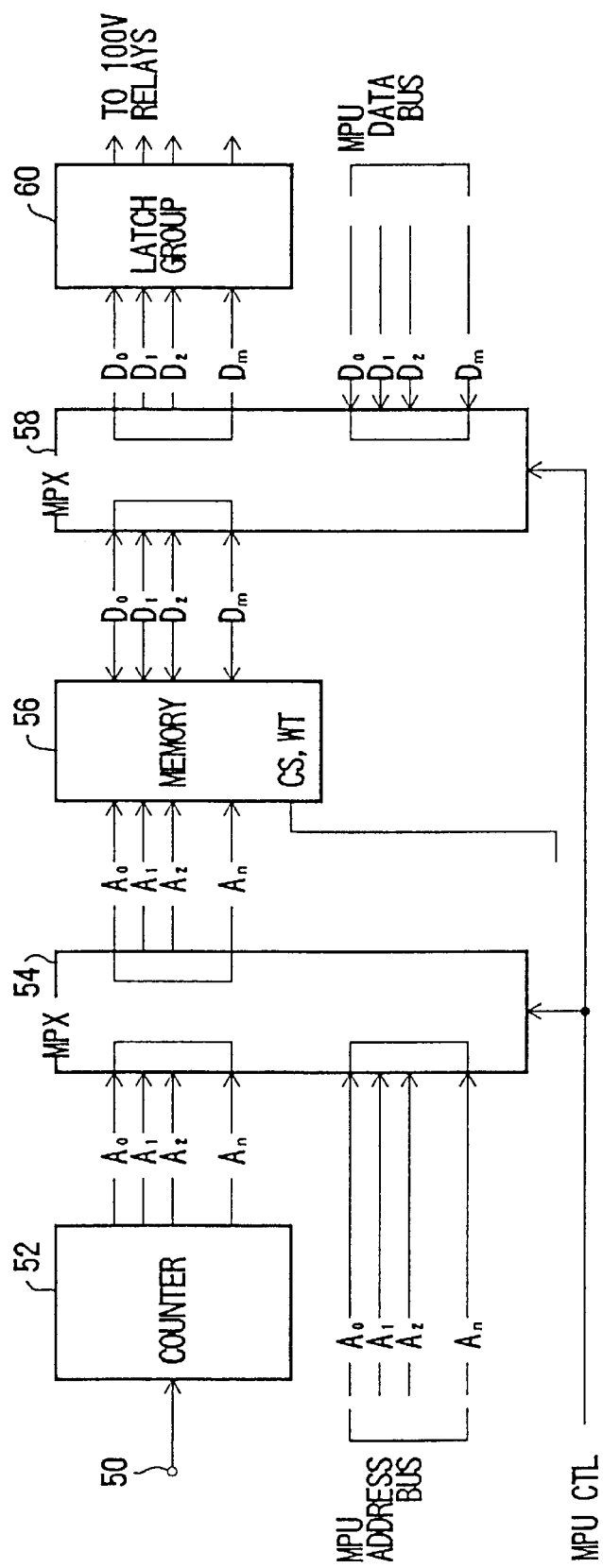
FIG. 4 shows a block diagram of an embodiment of a scheduler of the UPS of the present invention.

FIG. 4 shows a block diagram of an embodiment of each scheduler 24. In the figure, timing pulses are input to a terminal 50 from the master/slave changeover portion 22 of the same UPS. The timing pulses are supplied to a counter 52. Count values $A_0, A_1, A_2, \ldots, A_n$ output by the counter 52 are supplied to a multiplexer (MPX) 54. The MPU 14 of the same UPS supplies addresses $A_0, A_1, A_2, \ldots, A_n$ and a changeover control signal CTL to the MPX 54. Based on the changeover control signal CTL, the MPX 54 selects the count values during a data reading time, selects the addresses during a data writing time, and supplies the selected one to address input terminals of a memory 56.

The memory 56 is, for example, an SRAM backed up by a battery and is a non-volatile memory. Data input/output terminals of the memory 56 are connected to a multiplexer (MPX) 58. The MPX 58 connects the data input/output terminals of the memory 56 to a latch group 60 or to a data bus of the MPU 14 of the same UPS. Based on the changeover signal CTL, the MPX 58 connects the memory 56 to the data bus of the MPU 14 during the data writing time and connects the memory 56 to the latch group 60 during the data reading time. The latch group 60 consists of the latch portions $26_0, 26_1, 26_2, \ldots, 26_m$ shown in FIG. 1.

The addresses $A_0, A_1, A_2, \ldots, A_n$ and data $D_0, D_1, D_2, \ldots, D_n$ are supplied to the memory 56 from the MPU 14, and thereby, the data is written in the memory 56. The data is table data for performing power supply ON/OFF control of the respective output terminals. The table data is informed by the personal computer 40 or the master UPS $42_1$. In the table data, one bit corresponds to one output terminal of the respective output terminals. After the table data is written in the respective addresses of the memory 56, the MPU 14 uses the changeover control signal CTL, and thus, causes the memory 56 to enter a data reading mode.

Figure 5:
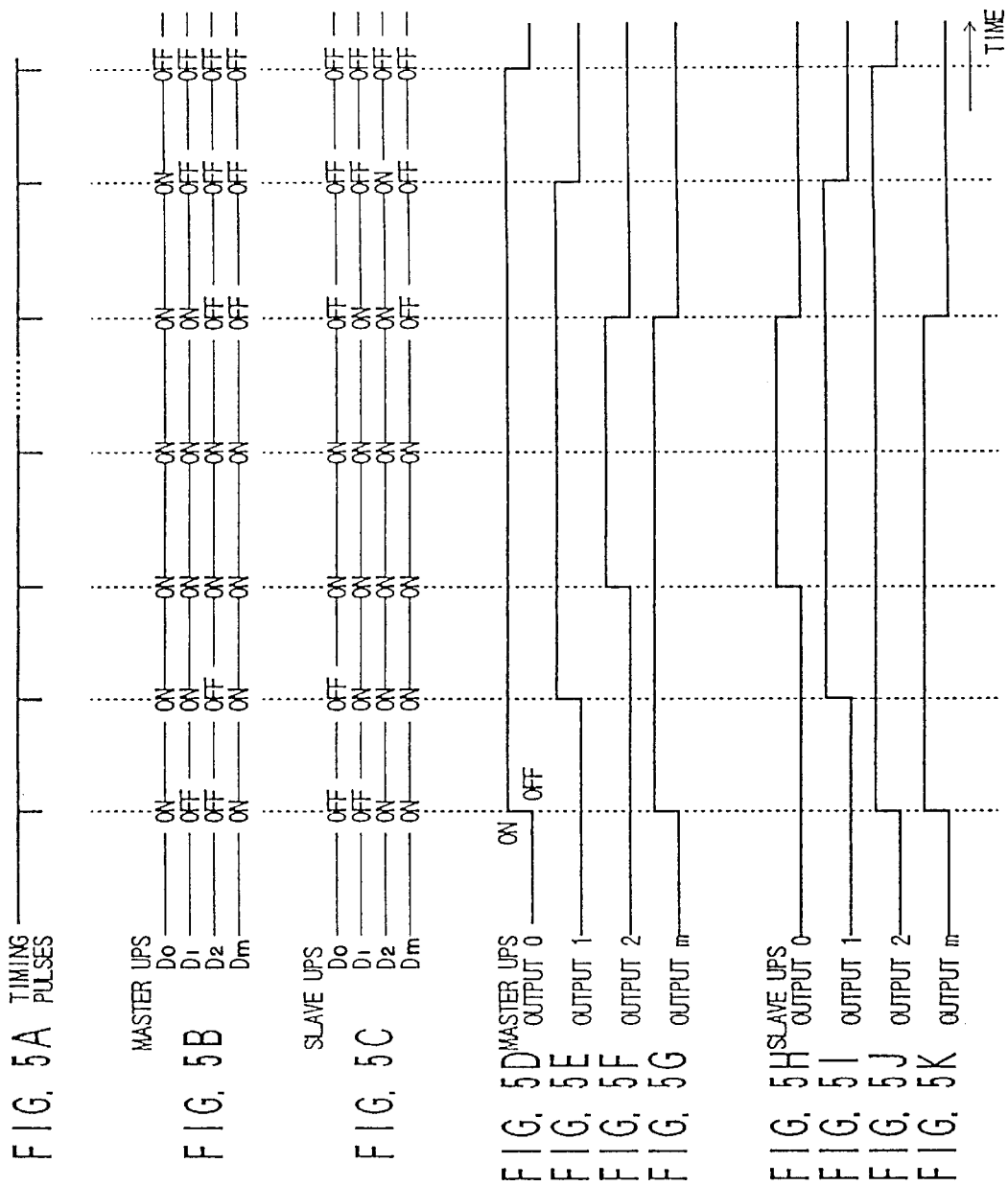
FIGS. 5A, 5B, 5C, 5D, 5E, 5F, 5G, 5H, 5I, 5J and 5K show signal timing charts for describing operations of the UPSs of the present invention.

Timing pulses such as those shown in FIG. 5A are supplied to the counter 52, and the counter 52 counts the timing pulses. The count values of the counter 52 are used as addresses for reading data from the memory 56. Thus, the table data $D_0, D_1, D_2, \ldots, D_m$ is read out from the memory 56 and is held by the latch group 60. For example, table data such as that shown in FIG. 5B is read out from the memory 56 of the master UPS $42_1$, and table data such as that shown in FIG. 5C is read out from the memory 56 of the slave UPS $42_2$. In the table data shown in FIGS. 5B and 5C, when a bit of the table data read out from the memory 56 is of a value 1, this means the power supply is ON, and when a bit of the table data read out from the memory 56 is of a value 0, this means the power supply is OFF.

According to the table data shown in FIG. 5B, the power supply ON/OFF of the respective output terminals $30_0, 30_1, 30_2$ and $30_m$ of the master UPS $42_1$ is controlled, as shown in FIGS. 5D, 5E, 5F and 5G, respectively. According to the table data shown in FIG. 5C, power supply ON/OFF of the respective output terminals $30_0, 30_1, 30_2$ and $30_m$ of the slave UPS $42_2$ is controlled, as shown in FIGS. 5H, 5I, 5J and 5K, respectively.

Figure 6:
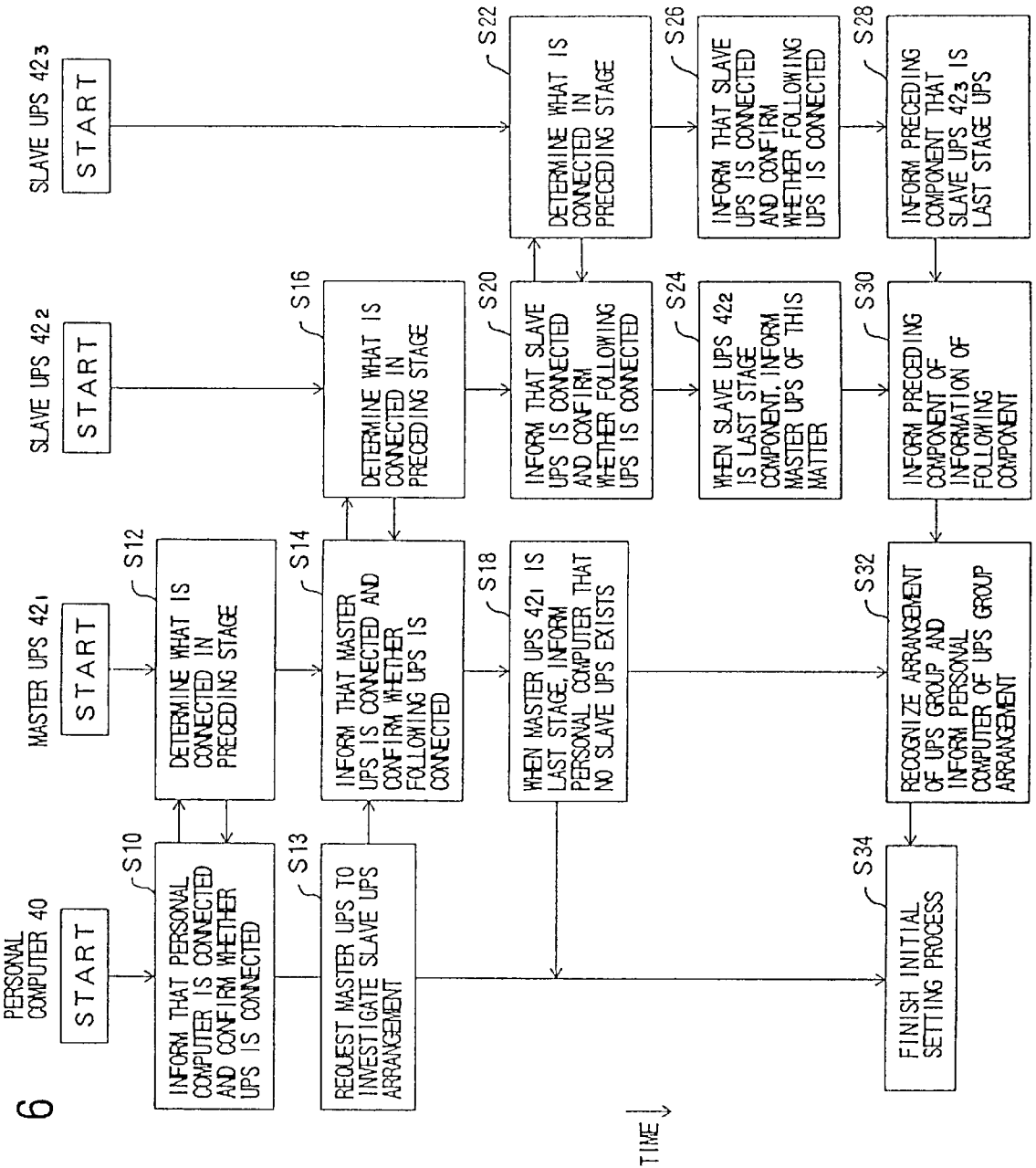
FIG. 6 shows an operation sequence of an initial setting process of a system in which the three UPSs are connected to the personal computer in cascade connection as shown in FIG. 2.

FIG. 6 shows an operation sequence of an initial setting process of a system in which the three UPSs $42_1, 42_2$ and $42_3$ are connected to the personal computer 40 in a cascade connection as shown in FIG. 2. In a step S10 (hereinafter, the term 'step' being omitted), the personal computer 40 informs the UPS $42_1$, which is connected to the personal computer 40, that the component connected to the UPS $42_1$ is a personal computer. Thus, the personal computer 40 performs a communication test to determine whether a UPS is connected to the personal computer 40. In S12, the master UPS $42_1$ receives the information. Thus, by communication via the interface 10 (port 1), the master UPS $42_1$ determines which one of a personal computer, a master UPS and a slave UPS is connected in the preceding stage. Then, the master UPS $42_1$ responds to the personal computer 40.

When the master UPS $42_1$ responds to the personal computer 40, in S13, the personal computer 40 sends to the master UPS $41_1$ instructions of investigating the arrangement of the slave UPSs (the number of the slave UPSs). Thereby, in S14, the master UPS $42_1$ informs, using the interface 12 (port 2) of the same UPS, the following UPS that the component connected to the following UPS is the master UPS, and confirms that the slave UPS is connected in the following stage. In S16, the slave UPS $42_2$ receives the information. Thus, by communication via the interface 10 (port 1) of the same UPS, the slave UPS $42_2$ determines which one of a personal computer, a master UPS and a slave UPS is connected in the preceding stage. Then, the slave UPS $42_2$ responds to the master UPS $42_1$. When the master UPS $42_1$ receives no response, there is no slave UPS and thus the master UPS $42_1$ is the last-stage UPS. In this case, in S18, the UPS $42_1$ informs the personal computer 40 that no slave UPS exists.

In S20, the slave UPS $42_2$, using the interface 12 (port 2) of the same UPS, informs the following UPS that the component connected to the following UPS is the slave UPS, and confirms whether the slave UPS is connected in the following stage. In S22, the slave UPS $42_3$ receives the information. Thus, by communication via the interface 10 (port 1) of the same UPS, the slave UPS $42_3$ determines which one of a personal computer, a master UPS and a slave UPS is connected in the preceding stage. Then, the slave UPS $42_3$ responds to the slave UPS $42_2$. When the slave UPS $42_2$ receives no response, there is no further slave UPS and thus the slave UPS $42_2$ is the last-stage UPS. In this case, in S24, the UPS $42_2$ informs the master UPS $42_1$ that no further slave UPS exists.

In S26, the slave UPS $42_3$, using the interface 12 (port 2) of the same UPS, informs a following UPS that the component connected to the following UPS is the slave UPS, and confirms whether a slave UPS is connected in the following stage. Then, when the slave UPS $42_3$ receives no response, there is no further slave UPS and thus the slave UPS $42_3$ is the last-stage UPS. In this case, in S28, the UPS $42_3$ informs the slave UPS $42_2$ that no further slave UPS exists.

The slave UPS $42_2$ receives the information of S28 from the slave UPS $42_3$, and, in S30, informs the master UPS $42_1$ of the information of the slave UPS $42_3$ which follows the slave UPS $42_2$. In S32, the master UPS $42_1$ recognizes, as the master UPS, the information of the arrangement of all the UPSs which is obtained from the processes of S24 or S30. In S32, the master UPS $42_1$ informs the personal computer 40 of the information of the arrangement of all the UPSs. The personal computer 40 receives this information or the information obtained from the process of S18, and then, in S34, finishes the initial setting process.

Figure 7:
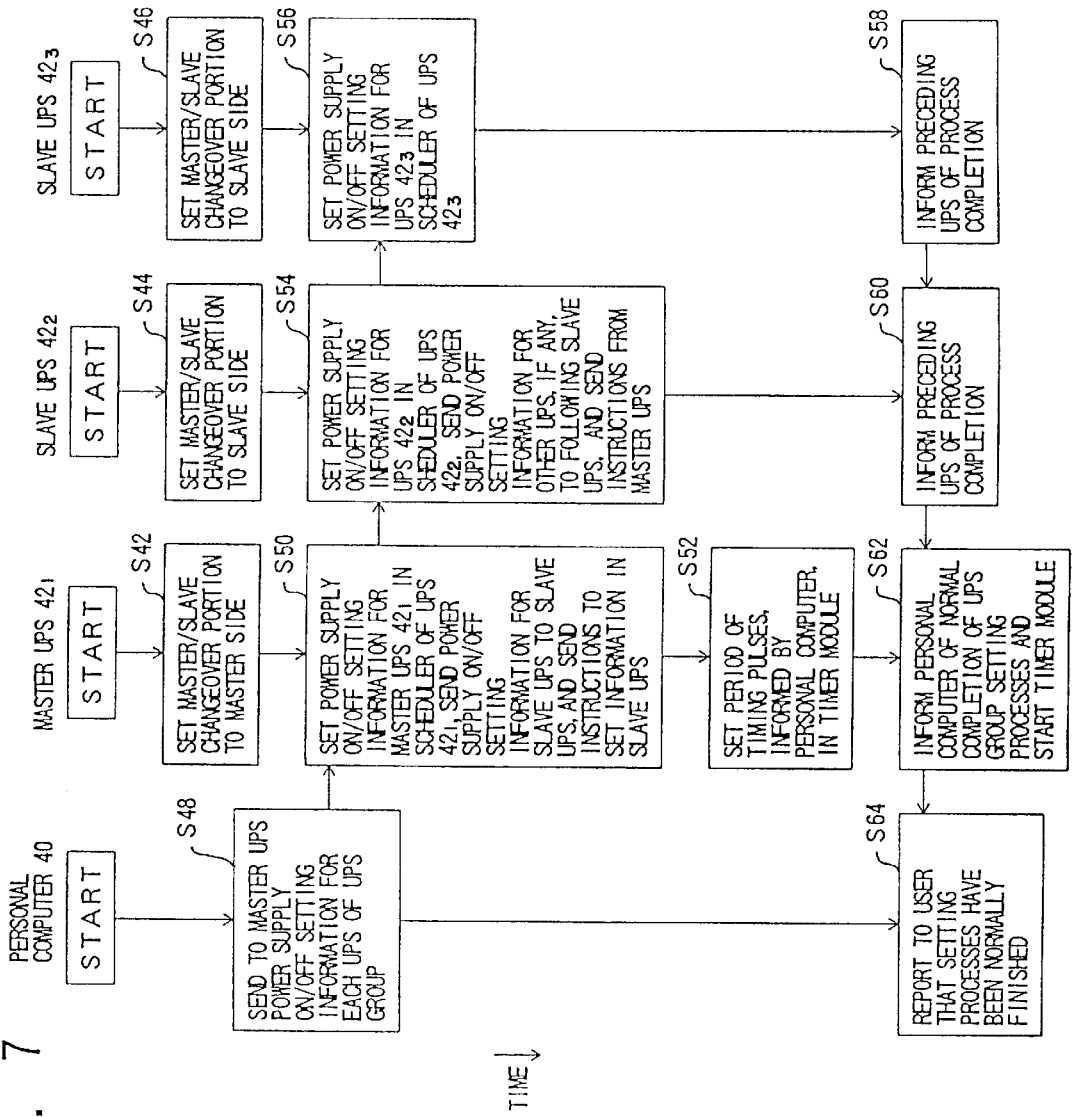
FIG. 7 shows an operation sequence of a power supply ON/OFF setting information setting process of the system in which the three UPSs are connected to the personal computer in cascade connection as shown in FIG. 2.

FIG. 7 shows an operation sequence of a power supply ON/OFF setting information setting process of the system in which the three UPSs $42_1, 42_2$ and $42_3$ are connected to the personal computer 40 in cascade connection as shown in FIG. 2. In S42, the UPS $42_1$ performs changeover of the master/slave changeover portion 22 of the same UPS so that the UPS $42_1$ acts as the master UPS. Thus, the master/slave changeover portion 22 selects the timing pulses supplied by the timer module 20. In contrast to this, in S44, the following UPS $42_2$ performs changeover of the master/slave changeover portion 22 of the same UPS so that the UPS $42_2$ acts as the slave UPS. Thus, the master/slave changeover portion 22 selects the timing pulses supplied from the interface 10. Similarly, in S46, the further following UPS $42_3$ performs changeover of the master/slave changeover portion 22 of the same UPS so that the UPS $42_3$ acts as the slave UPS. Thus, the master/slave changeover portion 22 selects the timing pulses supplied from the interface 10.

In S48, the personal computer 40 sends instructions to set information for the power supply ON/OFF setting of the respective output terminals of each of the UPSs $42_1$, $42_2$ and $42_3$ to the master UPS $42_1$. In S50, the master UPS $42_1$ breaks down the received power supply ON/OFF setting information into the power supply ON/OFF setting information for the respective UPSs $42_1$, $42_2$ and $42_3$. The master UPS $42_1$ writes and sets the power supply ON/OFF setting information for the same UPS in the memory 56 of the scheduler 24 of the same UPS as table data. The master UPS $42_1$ sends instructions, to the following slave UPSs $42_2$ and $42_3$, to set the power supply ON/OFF setting information for the UPS $42_2$ in the same UPS and to set the power supply ON/OFF setting information for the UPS $42_3$ in the same UPS. Then, in S52, the master UPS $42_1$ sets the period of the timing pulses, which is informed by the personal computer 40, to the timer module 20 of the same UPS.

In S54, the slave UPS $42_2$, in response to receiving, from the master UPS $42_1$, the instructions to set the information for power supply ON/OFF setting of the respective output terminals of the same UPS, writes and sets the power supply ON/OFF setting information in the memory 56 of the scheduler 24 of the same UPS as table data. When also receiving the power supply ON/OFF setting information for the other slave UPS which is sent from the master UPS $42_1$, the slave UPS $42_2$ supplies the received information to the following slave UPS $42_3$ and informs the UPS $42_3$ of the instructions from the master UPS $42_1$. In S56, the UPS $42_3$, in response to receiving the instructions to set the information for power supply ON/OFF setting of the respective output terminals of the same UPS, writes and sets the power supply ON/OFF setting information in the memory 56 of the scheduler 24 of the same UPS as table data.

In S58, after performing the process of S56, the slave UPS $42_3$ informs the preceding slave UPS $42_2$ of the completion of the process of S56. Then, in S60, after receiving this information and also after performing the process of S54, the slave UPS $42_2$ informs the preceding master UPS $42_1$ of the completion of the processes of S54 and S56. Then, in S62, after receiving this information and also after performing the process of S50 and S52, the slave UPS $42_1$ informs the personal computer 40 of the completion of information setting for the power supply ON/OFF setting of the respective output terminals of each of the UPSs $42_1$, $42_2$ and $42_3$. Then, the master UPS $42_1$ starts the timer module 20 of the same UPS.

In S64, after receiving the information from the master UPS $42_1$, the personal computer 40 shows the normal completion of the setting of the power supply ON/OFF setting information on a CRT display 41 (shown in FIG. 2) or the like. Thus, the personal computer 40 reports this matter to a user. Then, the processes are finished.

Thus, in this embodiment, timing of power supply start/ stop of the respective ones of the plurality of output terminals provided in one UPS can be independently set. Accordingly, a sequence and time differences of power supply start/stop can be arbitrarily set. Further, a sequence and time difference of power supply start/stop of the plurality of output terminals can be arbitrarily set using timing set through the personal computer. Accordingly, by supplying power to the personal computer and its peripheral equipment separately from the plurality of output terminals, it is possible that power supply start/stop of the personal computer and peripheral equipment can be performed sequentially in predetermined timing.

Further, the plurality of UPSs are connected in a cascade connection, and timing of the power supply start/stop of the respective output terminals of each of the plurality of UPSs is determined based on the timing pulses generated in the master UPS. Further, there is approximately no time delay when the timing pulses are transmitted between the UPSs. Accordingly, it is possible to precisely determine the timing of the power supply start/stop of the respective output terminals of each UPS. Further, because the UPSs are connected in a cascade connection, when a UPS is added due to addition of peripheral equipment or the like, the additional UPS is connected to the last-stage UPS of the original UPS group in a cascade connection. Accordingly, it is not necessary to add an interface to the personal computer. In the arrangement of the embodiment, timing of the power supply start/stop of the respective output terminals of each of the plurality of UPS can be set through the personal computer. Further, various kinds of information, such as the remaining battery power, the remaining battery life (the number of repetitive charging and discharging operations), the voltage of the commercial power supply, the currents consumed by the loads, and so forth, concerning the plurality of UPSs is informed to the personal computer from the master UPS. Using such information, the personal computer can manage the plurality of UPSs.

Figure 8:
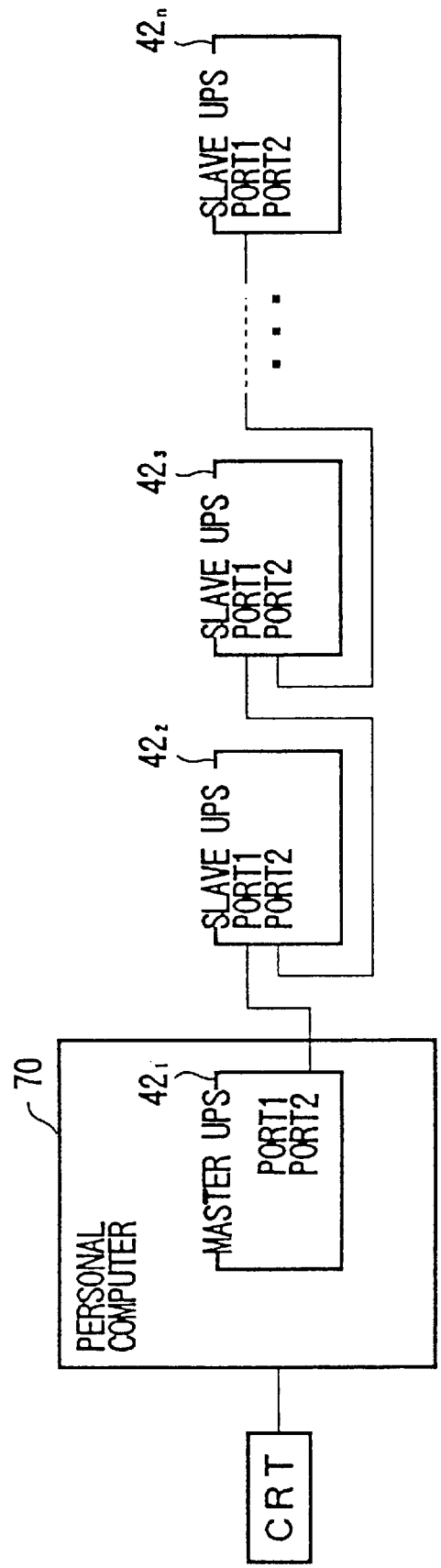
FIG. 8 shows a block diagram of an alternative arrangement of the arrangement shown in FIG. 2.

As shown in FIG. 8, it is possible that a personal computer 70 has the master UPS $42_1$ self-contained, and the slave UPSs $42_2$, $42_3$, . . . , $42_n$ are connected to the master UPS $42_1$ in a cascade connection. The operations of the system shown in FIG. 8 are identical to those of the system shown in FIG. 2.

Further, the present invention is not limited to the above-described embodiments, and variations and modifications may be made without departing from the scope of the present invention claimed in the following claims.

What is claimed is:

1. An uninterruptible power supply apparatus supplying power to electronic apparatuses, comprising:

a plurality of output terminals supplying power;

a timing holding unit holding timing information of a power supply start and/or stop of respective ones of said plurality of output terminals, said timing information being set independently for each of said plurality of output terminals; and a timing pulse generating unit generating timing pulses for reading out the timing information from said timing holding unit, wherein the power supply start and/or stop of each output terminal is performed based on the timing information read out from said timing holding unit and the timing information held by said timing holding unit is set by a user.

2. The uninterruptible power supply apparatus according to claim 1, further comprising a first interface, wherein said uninterruptible power supply apparatus is connected to a computer through said first interface and the timing information is supplied from the computer and is held by said timing holding unit.

3. The uninterruptible power supply apparatus according to claim 2, further comprising a second interface, wherein said uninterruptible power supply apparatus is connected to a preceding apparatus through said first interface and is connected with a following apparatus through said second interface so that a plurality of uninterruptible power supply apparatuses are connected in a cascade connection.

4. The uninterruptible power supply apparatus according to claim 3, wherein:

each of said first and second interfaces has a timing pulse line supplying the timing pulses, and a changeover unit using, in reading of the timing information from said timing holding unit, timing pulses supplied from a preceding apparatus through the timing pulse line of said second interface of the preceding apparatus and the timing pulse line of said first interface of said first interface of said uninterruptible power supply apparatus, instead of using the timing pulses generated by said timing pulse generating unit of said uninterruptible power supply apparatus.

5. The uninterruptible power supply apparatus according to claim 3, wherein first one of the plurality of uninterruptible power supply apparatuses connected in the cascade connection is connected to a computer and said first one of the plurality of uninterruptible power supply apparatuses transmits and receives information of all of said plurality of uninterruptible power supply apparatuses from the computer.

6. The uninterruptible power supply apparatus according to claim 5, wherein information of operational states of respective ones of the plurality of uninterruptible power supply apparatuses connected in the cascade connection is supplied to the computer from said first one of the plurality of uninterruptible power supply apparatuses.

7. The uninterruptible power supply apparatus according to claim 1, wherein said timing holding unit comprises:

a non-volatile memory storing the timing information; and a counter counting the timing pulses and generating addresses for reading out the timing information from said non-volatile memory.

8. An uninterruptible power supply apparatus, comprising:

a plurality of output terminals supplying power; and a timing holding unit holding timing information of a power supply start and/or stop of respective ones of said plurality of output terminals, said timing information being set independently for each of said plurality of output terminals, wherein the power supply start and/or stop of each output terminal is performed based on the timing information read out from said timing holding unit and the timing information held by said timing holding unit is set by a user.

* * * * *